United States Patent [19]

Denny

[11] Patent Number: 5,573,125
[45] Date of Patent: Nov. 12, 1996

[54] HORIZONTAL RETRACTING PALLET RACK GUARD

[75] Inventor: David S. Denny, Middle Haddam, Conn.

[73] Assignee: The Sinco Group, Inc., East Hampton, Conn.

[21] Appl. No.: 393,081

[22] Filed: Feb. 22, 1995

[51] Int. Cl.[6] .................................................. A47F 5/00
[52] U.S. Cl. ........................ 211/183; 211/180; 211/191; 160/84.01
[58] Field of Search .................................. 211/183, 189, 211/180, 191, 175; 160/84.01, 194, 84.02

[56] References Cited

U.S. PATENT DOCUMENTS

| | | | |
|---|---|---|---|
| 4,424,849 | 1/1984 | Robertson | 160/84.01 X |
| 4,815,613 | 3/1989 | Hollander | 211/191 |
| 4,981,225 | 1/1991 | Cole | 211/183 |
| 5,170,829 | 12/1992 | Duncan et al. | 211/191 X |

*Primary Examiner*—Robert W. Gibson, Jr.
*Attorney, Agent, or Firm*—Chilton, Alix & Van Kirk

[57] ABSTRACT

A rack guard for a pallet rack employs a retractable safety net. The net is mounted at the top and bottom to a cable which is offset from the pallet rack. The sides of the net are latched to vertical members of the pallet rack while the net is extended across the front of the pallet rack.

23 Claims, 5 Drawing Sheets

HORIZONTAL RETRACTING PALLET RACK GUARD

BACKGROUND OF THE INVENTION

This invention relates generally to net systems which are employed as safety barriers. More particularly, the present invention relates to safety net systems which are installed to pallet racks and the like.

Pallet racks have for a number of years provided a primary storage support structure in large warehousing, storage and distribution facilities. In such highly efficient modernized warehousing operations, fork lifts or other vehicles are commonly employed to load or remove loaded pallets from the pallet racks. Large retailing operations have also recently employed pallet racks to both store and display products in the retail showroom. As the size of the facilities has increased and the direct access of the public to pallet racks systems has increased, the damage potential due to accidental droppage or improper loading of the pallet racks has also escalated. There are also increased security problems associated with theft and vandalism of the contents of the pallet racks. Safety net systems have been installed to enhance the safety and minimize safety risks from mishandling or misloading of the pallet racks. A large number of conventional safety net systems are essentially custom installed safety net systems. Few, if any, conventional safety net systems have addressed security considerations for the pallet racks.

In U.S. Pat. No. 5,170,829 assigned to the assignee of the present invention, a retractable net guard system adapted for mounting to a pallet rack comprises a pair of laterally spaced vertically extending tracks. The tracks are mounted to the pallet rack in offset relationship to one side of the pallet rack. The carriers, which in a preferred embodiment, comprise a plurality of rollers traverse along the tracks. The rollers connect with clips which attach to the net. The net is vertically raised or lowered by either a motor apparatus mounted generally above the pallet rack or a manually operated retracting mechanism.

In U.S. Pat. No. 4,981,225 assigned to the assignee of the present invention, a universal safety net system which is especially adapted for installation to pallet racks employs extension members mounted to the pallet rack structure. The extension members are variably adjustable for extending the effective height of the pallet racks and the posts. Offset members which include a series of openings for implementing a preestablished offset spacing from the pallet rack are also employed. Cables are then suspended between the offset members and/or extension members to provide a cable framework which supports the safety net.

For certain applications, it is advantageous that the safety net be retractable from the side to allow easy access to the pallet racks. For example, the safety net may be retracted to permit loading or unloading of the pallet rack and/or the net may be retracted to permit public access to the contents of the rack as desired. It is also advantageous that the net may be retracted without the use of motors or pulleys, that the net may be locked in the fully deployed condition, and that the safety barrier is especially adapted for installation in connection with a wide range of pallet rack shapes, size and load requirements. In addition to functioning as a safety barrier, the net may be employed as a rack guard to ensure the security of the contents.

SUMMARY OF THE INVENTION

Briefly stated, the invention in a preferred form is a horizontal retracting pallet rack guard adapted for mounting to a pallet rack. The rack guard comprises a safety net slidably mounted on a cable by rings, clips or the like. The cable is mounted on a pallet rack in offset relationship to one side of the pallet rack by a plurality of cable mounts. The sides of the safety net are latched to vertical members of the pallet rack by latch mechanisms while the net is extended across the front of the pallet rack.

The cable mounts are comprised of a base and a rectangular tubular member outwardly extending therefrom. Each tubular member has a plurality of longitudinally spaced transverse apertures in each of its four sides. The apertures are spaced at the same longitudinal intervals on each of the four sides. The cable is mounted to the cable mounts by passing one of the cable ends through a corresponding pair of matching apertures on each cable mount. The aperture is selected on the basis of the desired offset between the safety net and the front of the pallet rack.

An object of the invention is to provide a new and improved retractable safety net system for a pallet rack.

Another object of the invention is to provide a new and improved rack guard which is efficient and is relatively easy to install on a conventional pallet rack.

A further object of the invention is to provide a new and improved net guard system which is retractable from the side to allow easy access to the pallet racks.

A further object of the invention is to provide a new and improved net guard system which is retractable without the use of motors or pulleys.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DETAILED DESCRIPTION OF THE PREFERRED EMBODIMENT

With reference to the drawings, a horizontal retracting pallet rack guard in accordance with the present invention designated generally by the numeral 10 has been affixed to a representative pallet rack 20 of conventional form and function. The rack guard employs a safety net 30 which is extendable in a guard mode (FIG. 1) to substantially cover a front face or side of the pallet rack 20. The net 30 also laterally or horizontally retracts to provide access to the pallet rack through the front face. The pallet rack guard 10 is adapted for mounting to a wide variety of pallet racks. Multiple rack guard systems may be mounted for a given pallet rack installation.

Figure 2:
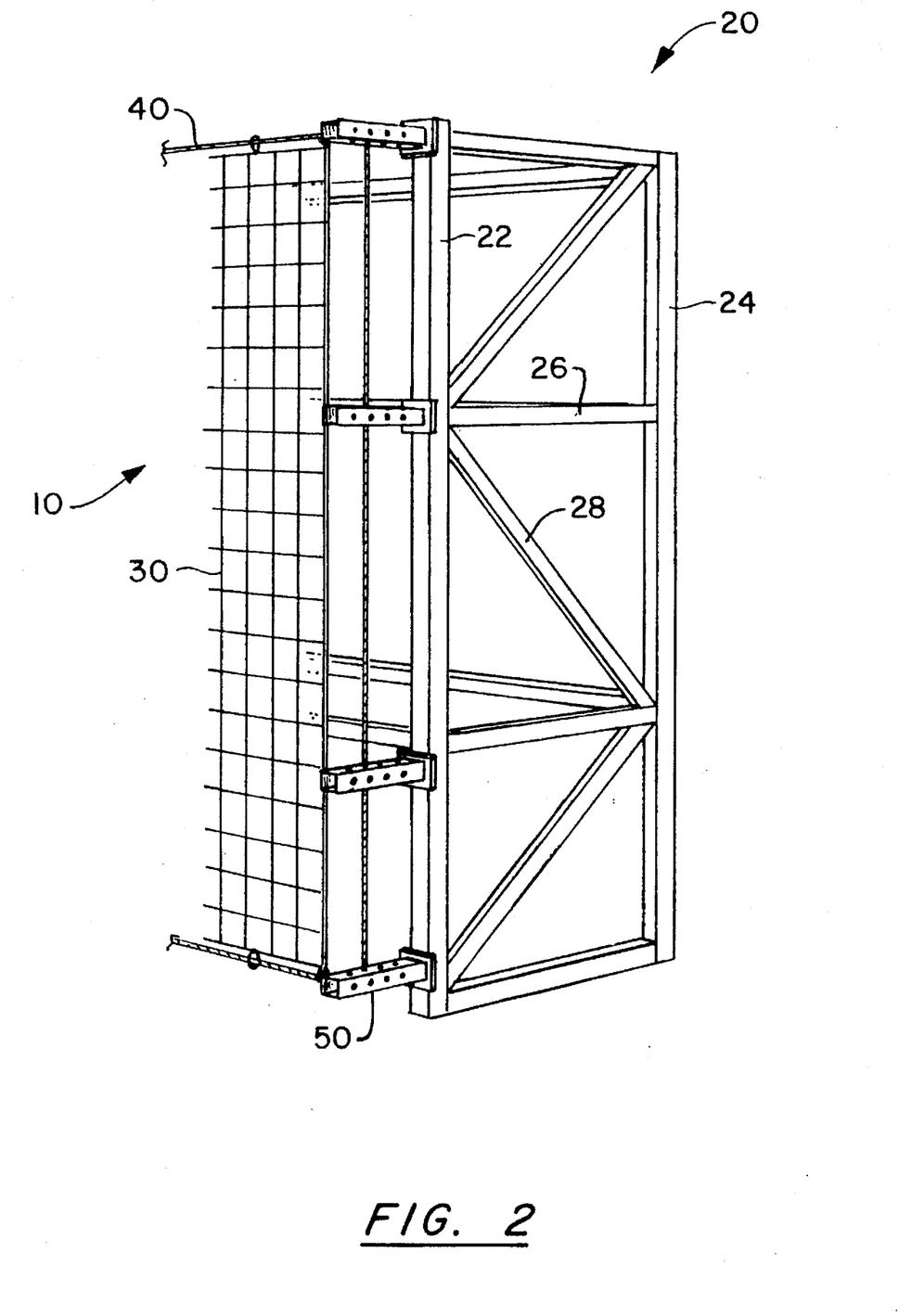
FIG. 2 is a fragmentary perspective view of a pallet rack and the rack guard of FIG. 1.

With reference to FIG. 2, a prototypical pallet rack 20 comprises longitudinally spaced pairs of front and rear upright support post 22, 24. Load beams 26 which extend laterally and from front to rear are supported by the support posts. Pallets are ordinarily loaded cross-wise onto the load beams 26 from front to rear. Various packages or products are supported on the pallets. Various bracing and reinforcing members 28 are also ordinarily provided to reinforce and stabilize the pallet rack 20. It should be noted that the pallets frequently overhang or extend forwardly from the support posts 22, 24 and the load beams 26.

The safety net 30 functions as a safety barrier in case of misloading and/or accidental dislodgment of loads onto or off of a pallet rack. The retractable pallet rack guard 10 is adapted for mounting to a wide range of pallet rack shapes, sizes and load configurations. Accordingly, rack 20 is intended to be illustrative of numerous forms and types of pallet racks and other racks to which the safety system has application. Likewise, the retractable net guard may assume numerous configurations other than the specific illustrated retractable net guard 10 described herein.

Figure 1:
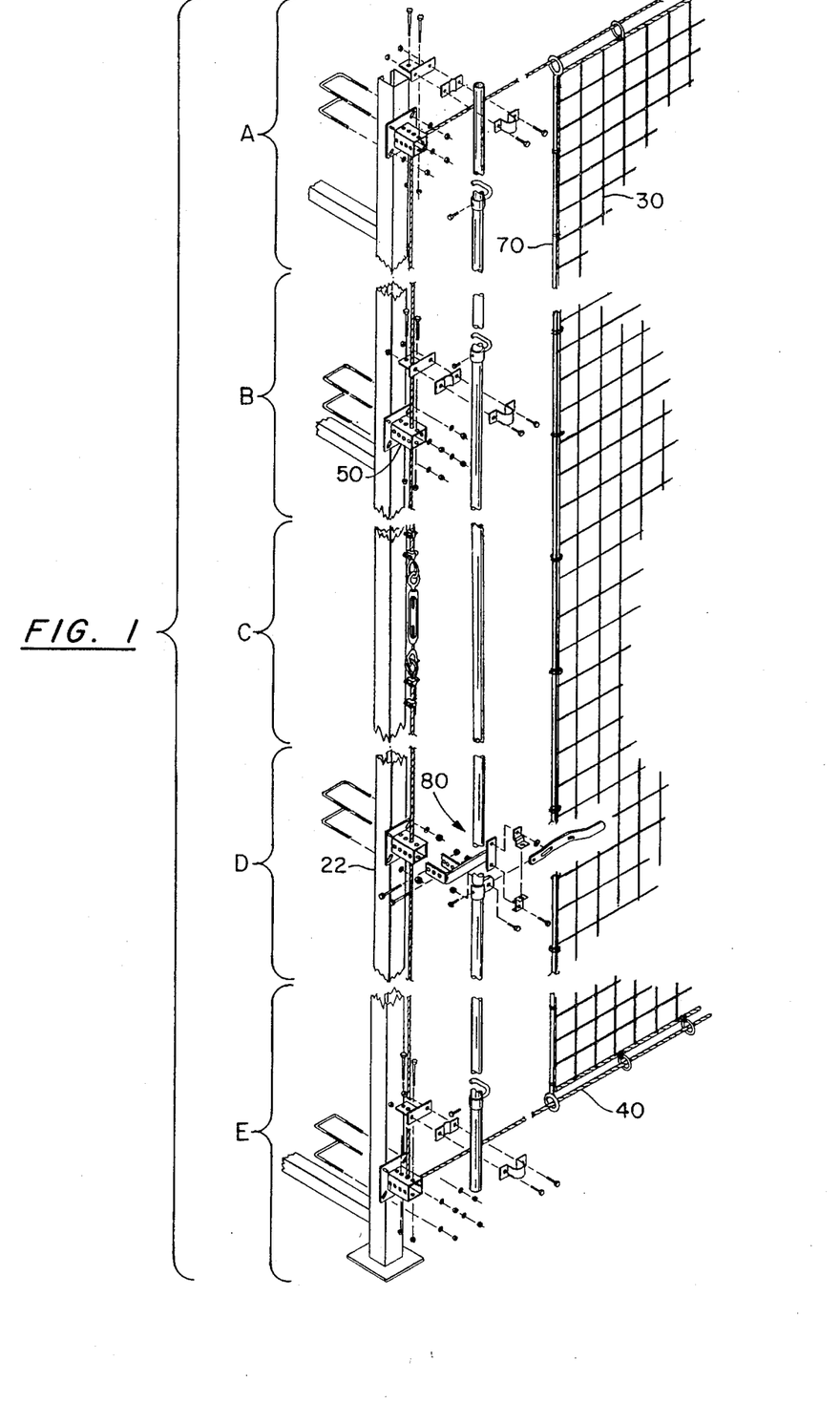
FIG. 1 is an exploded fragmentary perspective view, partly broken away, of a horizontal retracting pallet rack guard in accordance with the present invention.
Figure 3:
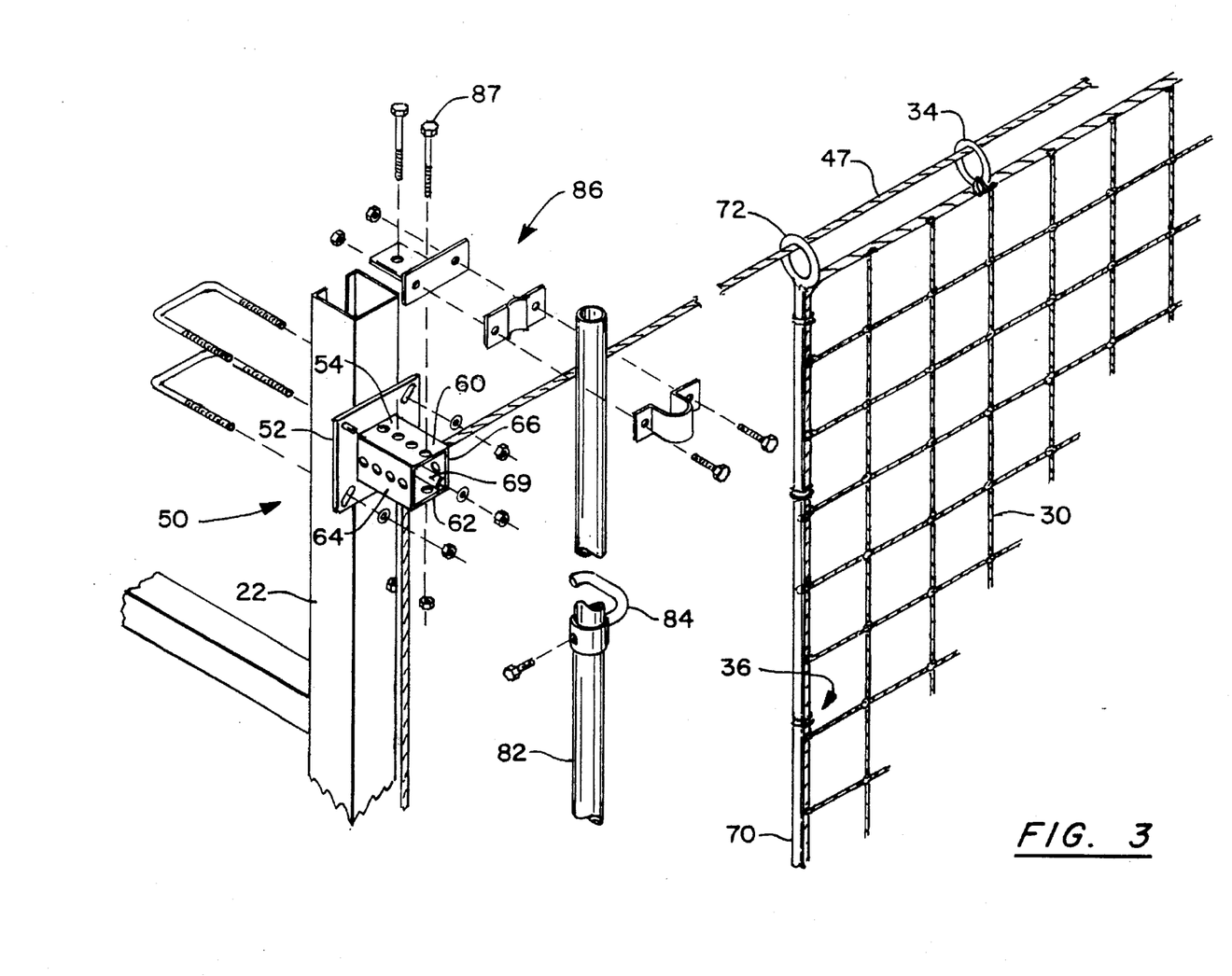
FIG. 3 is an enlarged perspective view of area A of FIG. 1.
Figure 4:
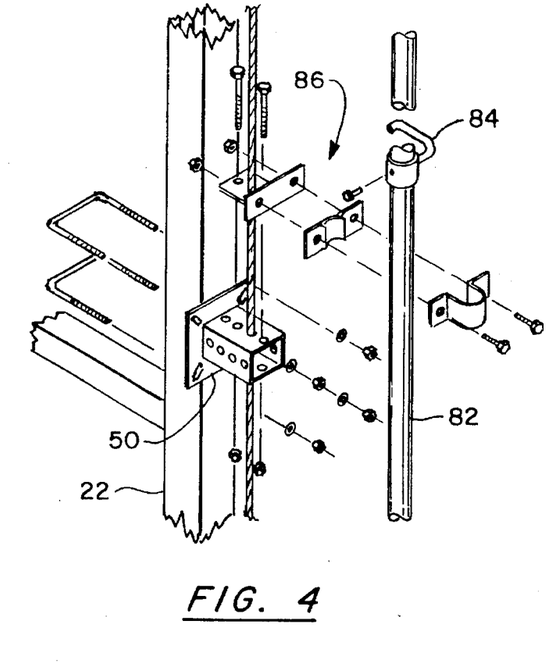
FIG. 4 is an enlarged perspective view of area B of FIG. 1.
Figure 5:
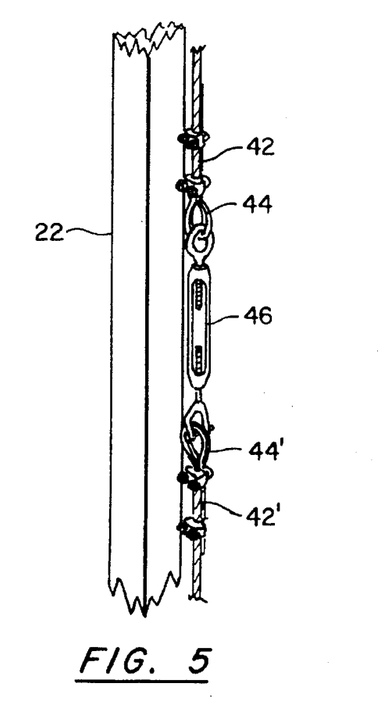
FIG. 5 is an enlarged perspective view of area C of FIG. 1.
Figure 6:
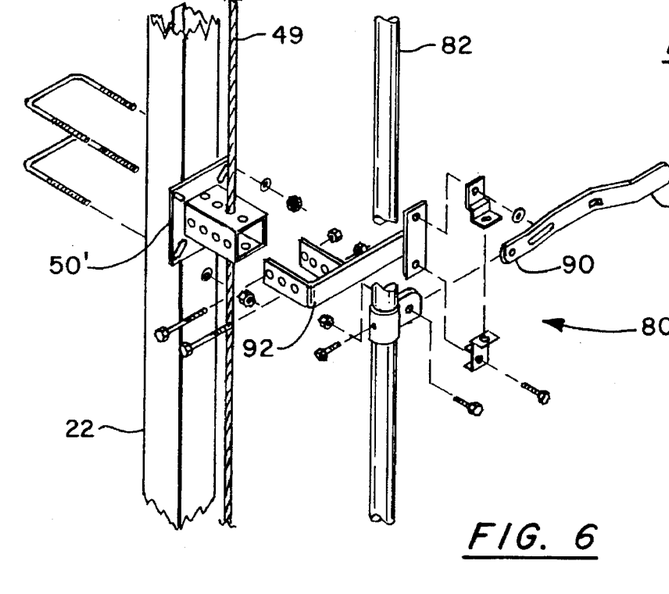
FIG. 6 is an enlarged perspective view of area D of FIG. 1.
Figure 7:
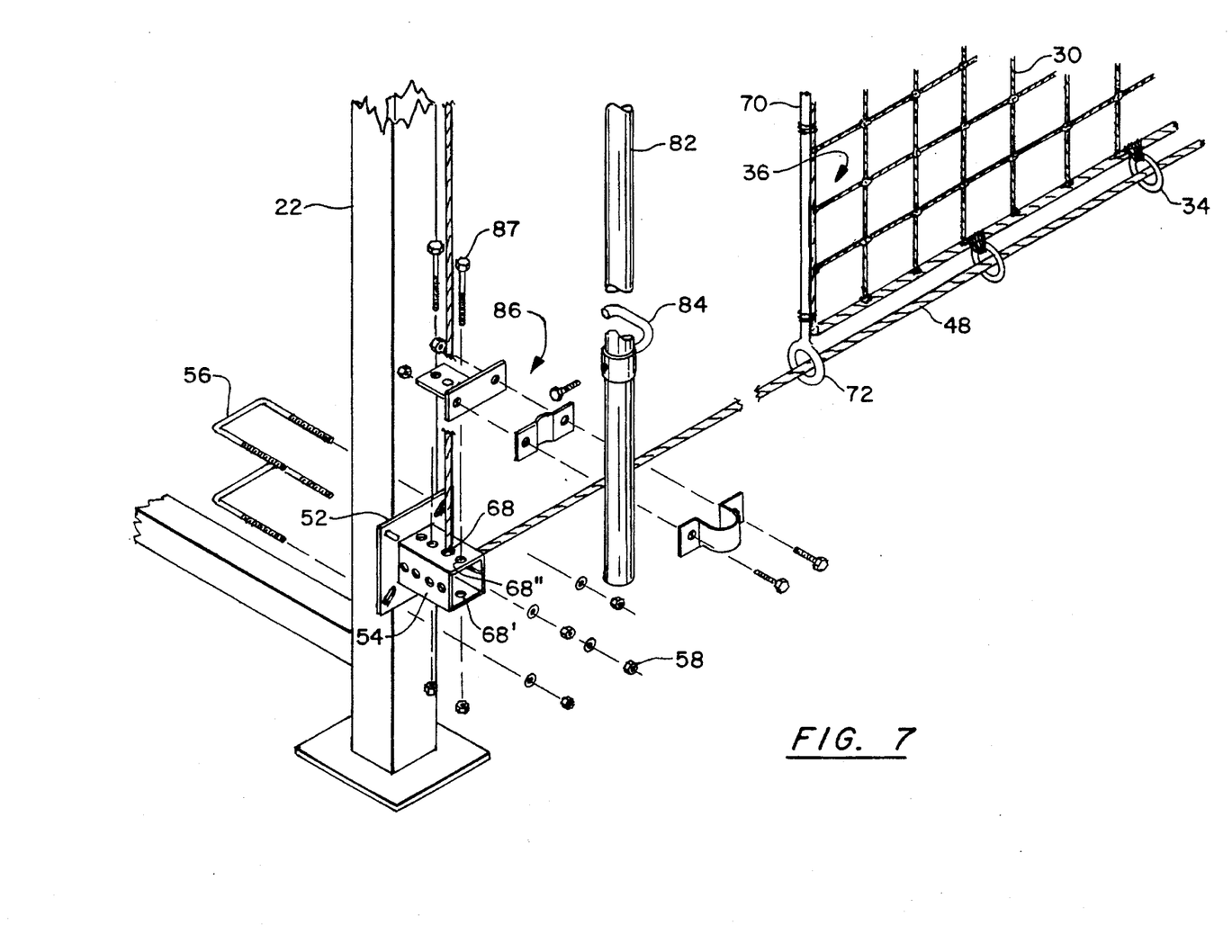
FIG. 7 an enlarged perspective view of area E of FIG. 1.

The safety net 30 is mounted on a cable 40 which is mounted on the pallet rack 20 by a plurality of cable mounts 50. Each cable mount 50 is comprised of a base 52 and a rectangular tubular member 54 which extends from the base 52. The base 52 is mounted to a front upright support post 22 by a pair of threaded U-shaped brackets 56 and nuts 58. Each tubular member 54 has a plurality of longitudinally spaced transverse apertures 68 in each of its four sides 60, 62, 64, 66. The apertures 68 are spaced at the same longitudinal intervals on each of the four sides 60, 62, 64, 66 such that each aperture 68 in one side 60, 64 of the tubular member is substantially coaxial with an aperture 68' in the opposite side 62, 66 of the member and the two axis so defined intersect.

The cable 40 is mounted to the cable mounts 50 by passing one of the cable ends 42 through a corresponding pair of matching apertures 68, 68' or 68, 68' on each cable mount 50. The cable 40 forms a continuous suspended structure on the front face of the pallet rack 20. The cable 40 changes from a horizontal orientation to a vertical orientation by passing the cable end 42 through adjacent apertures 68, 68" in a cable mount 50. A cable mount corner brace 69 may have an interior quarter-round section, providing a rounded surface to guide and support the cable 40 in the cable mount 50. The aperture 68 location for a given cable suspension is selected on the basis of the desired offset between the safety net 30 and the front of the pallet rack 20. Eyes 44 are mounted on each cable end 42, 42' after the cable has been mounted on each cable mount 50. A turnbuckle 46 connects the two eyes 44, 44'. The turnbuckle 46 is torqued to impose a tensile stress on the cable and force the cable 40 to a stable taut condition.

The safety net 30 is mounted to top and bottom portions 47, 48 of the cable 40 by mounting rings 34. The rings 34 are free to slide along the cable 40, allowing the net to be extended across the front of the pallet rack 20 or to be retracted to permit access to the front of the pallet rack 20. In a preferred embodiment, a stiffening rod 70 is attached to each side edge portion 36 of the safety net 30. The rod 70 ensures that the safety net 30 moves uniformly as it is repositioned and also provides additional mechanical strength to the side edge portions 36. The rod 70 is mounted on the cable top and bottom portions 47, 48 by a loop 72 at each end of the rod 70.

In a preferred embodiment, the safety net side edge portions 36 are latched to two front support posts 22. Alternatively, one side edge portion 36 may be latched and the other side edge portion (not shown) may be attached to a support post 22 or a side portion 49 of the cable 40. The latch 80 is comprised of a vertical tubular member 82 and a plurality of hooks 84. Preferably, the tubular member 82 is mounted to the cable mounts 50 by latch brackets 86. The latch brackets 86 are attached to the cable mounts 50 by bolts 87 that are received by cable mount apertures 68 that are not being utilized by the cable 40. Alternatively, the latch brackets 86 may be mounted to the support post 22. The tubular member 82 is free to rotate about its axis whereby the hooks 84 engage or disengage the adjacent safety net side edge portion 36 and stiffening rod 70. A handle 88 is pivotally attached at one end 90 to the tubular member 82. When the handle 88 is in a vertical position, it engages a latch plate 92 mounted on one of the cable mounts 50'. The handle 88 prevents rotation of the tubular member 82 when it is engaged with the latch plate 92, therefore preventing disengagement of the hooks 84 from the safety net 30.

The specific dimensions and number of guard units 10 required for a given pallet rack system will vary in accordance with the specific dimensional and structural constraints of the pallet racks 20. In conventional warehousing type configurations, wherein multiple pallet racks 20 are interconnected along an extended aisle, multiple rack guard units 10 may be assembled in side-by-side relationship. Utilizing one rack guard 10 for each pallet rack 20 provides the greatest degree of operational flexibility. The rack guard 10 for each pallet rack 20 may be operated independently, providing access or protection for each pallet rack 20 as desired. Alternatively, a single rack guard 10 may extend in front of a number of pallet racks 20.

While preferred embodiments have been shown and described, various modifications and substitutions may be made thereto without departing from the spirit and the scope of the invention. Accordingly, it is to be understood that the present invention has been described by way of illustration and not limitation.

What is claimed is:

1. A rack guard for a pallet rack having a plurality of horizontally spaced upright posts and having at least a first side, the rack guard comprising:

a plurality of mounting means, each of said mounting means having a base member mountable on one of the upright posts and a cable suspension extension offset from said base;

cable means comprising a cable mountable to said mounting means extensions to form a pair of generally horizontal sections;

a plurality of carrier means mountable on said cable and horizontally displaceable therealong;

net means mountable to said carrier means and expandable for spanning an area across the pallet rack first side to form a barrier for the pallet rack and retractable to permit access to the pallet rack first side; and latch means for latching said net means in a fixed position.

2. The rack guard of claim 1 wherein said latch means comprises a vertical member and hook means, said vertical member being mounted in offset relationship to said pallet rack first side, said vertical member defining a vertical axis and being rotatable about said vertical axis, said hook means being engageable with said net means on rotation of said vertical member.

3. The rack guard of claim 2 wherein said latch means further comprises handle means and a latch plate, said latch plate being mounted in offset relationship to said pallet rack first side, said handle means being pivotally mounted on said vertical member and engageable with said latch plate for locking said hook means in engagement with said net means.

4. The rack guard of claim 3 wherein said net means comprises opposite first and second vertical edge regions and rod means mounted on each of said vertical edge regions wherein a said latch means engages a said vertical edge region and rod means.

5. The rack guard of claim 4 wherein each of said rod means has opposite first and second ends, said first and second ends each defining an aperture for slidably receiving said cable.

6. The rack guard of claim 1 wherein said mounting means base comprises a plate mounted against said upright post, said mounting means extension further comprising a tubular member extending outwardly from said plate.

7. The rack guard of claim 6 wherein said tubular member has opposite first and second surfaces, said tubular member further having opposite third and fourth surfaces, said surfaces each defining a plane wherein said first and second surface planes are substantially perpendicular to said third and fourth surface planes.

8. The rack guard of claim 7 wherein each of said surfaces defines a plurality of longitudinally spaced transverse apertures for receiving said cable, each of said apertures in said first surface being substantially coaxial with an aperture in said second surface, each of said apertures in said third surface being substantially coaxial with an aperture in said fourth surface.

9. The rack guard of claim 1 further comprising tension means for applying a tensile stress on said cable.

10. The rack guard of claim 7 wherein said first, second, third and fourth surfaces define a rectangular cross section, said tubular member further comprising brace means longitudinally disposed between adjacent of said surfaces.

11. The rack guard of claim 10 wherein said brace means comprises a corner brace having a quarter round section providing a rounded surface.

12. A rack guard for a pallet rack having a plurality of horizontally spaced upright posts and having a front side, the rack guard comprising:

cable means comprising a cable, said cable having horizontal top and bottom portions;

mounting means, for mounting said cable in offset relationship to the posts on the front side;

a plurality of carrier means mounted on said cable top and bottom portions and horizontally displaceable therealong;

net means mountable to said carrier means and expandable for spanning an area across the pallet rack front side to form a barrier for the pallet rack and retractable to permit access to the pallet rack front side, said net means having first and second side portions; and fastening means for fastening said net means first and second side portions in a fixed position.

13. The rack guard of claim 12 wherein at least one of said fastening means comprises latch means comprising a vertical member and hook means, said vertical member being mounted in offset relationship to said pallet rack front side, said vertical member defining a vertical axis and being rotatable about said vertical axis, said hook means being engageable with a said net means side portion on rotation of said vertical member.

14. The rack guard of claim 13 wherein said latch means further comprises handle means and a latch plate, said latch plate being mounted in offset relationship to said pallet rack front side, said handle means being pivotally mounted on said vertical member and engageable with said latch plate for preventing rotation of said vertical member.

15. The rack guard of claim 13 wherein said net means comprises rod means mounted on each of said first and second side portions wherein a said latch means is engageable with a said side portion and a said rod means, each of said rod means having opposite first and second ends, said first and second ends each defining an aperture for slidably receiving said cable.

16. The rack guard of claim 12 wherein said mounting means comprises a plurality of cable mounts, each of said cable mounts having a base and a tubular member extending outwardly from said base.

17. The rack guard of claim 16 wherein said tubular member has opposite first and second surfaces and opposite third and fourth surfaces defining a rectangular cross section, each of said surfaces defining a plurality of longitudinally spaced transverse apertures for receiving said cable, each of said apertures in said first surface being substantially coaxial with an aperture in said second surface, each of said apertures in said third surface being substantially coaxial with an aperture in said fourth surface, said tubular member comprising brace means longitudinally extending between adjacent of said surfaces.

18. The rack guard of claim 17 wherein said brace means comprises a corner brace having a quarter round section providing a rounded surface.

19. A pallet rack and safety net system comprising:

a pallet rack having a plurality of horizontally spaced upright posts supporting horizontally disposed load beams and at least a first side;

cable means comprising a cable having vertical first and second side portions and horizontal top and bottom portions;

mounting means, for mounting said cable in offset relationship to said posts on said first side;

a plurality of carrier means mounted on said cable top and bottom portions and horizontally displaceable thereal­ong;

net means mounted to said carrier means and expandable for spanning an area across said pallet rack first side to form a barrier for said pallet rack and retractable to permit access to said pallet rack first side, said net means having first and second side portions; and fastening means for fastening said net means first and second side portions in a fixed position.

20. The rack guard of claim 19 wherein at least one of said fastening means comprises latch means comprising a vertical member and hook means, said vertical member being mounted in offset relationship to said pallet rack first side, said vertical member defining a vertical axis and being rotatable about said vertical axis, said hook means being engageable with a said net means side portion on rotation of said vertical member.

21. The rack guard of claim 20 wherein said latch means further comprises handle means and a latch plate, said latch plate being mounted in offset relationship to said pallet rack first side, said handle means being pivotally mounted on said vertical member and engageable with said latch plate for preventing rotation of said vertical member.

22. The rack guard of claim 20 wherein said net means comprises rod means mounted on each of said first and second side portions wherein a said latch means is engageable with a said side portion and a said rod means, each of said rod means having opposite first and second ends, said first and second ends each defining an aperture for slidably receiving said cable.

23. The rack guard of claim 19 wherein said mounting means comprises a plurality of cable mounts, each of said cable mounts having a base and a rectangular tubular member extending outwardly therefrom, said tubular member having opposite first and second surfaces and opposite third and fourth surfaces, each of said surfaces defining a plurality of longitudinally spaced transverse apertures for receiving said cable, each of said apertures in said first surface being substantially coaxial with an aperture in said second surface, each of said apertures in said third surface being substantially coaxial with an aperture in said fourth surface.

* * * * *

UNITED STATES PATENT AND TRADEMARK OFFICE
CERTIFICATE OF CORRECTION

PATENT NO.   : 5,573,125
DATED        : November 12, 1996
INVENTOR(S)  : David S. Denny and Kevin D. Ouellette It is certified that error appears in the above-indentified patent and that said Letters Patent is hereby corrected as shown below:

Front page at [75], after "Conn." insert --; Kevin D. Ouellette, Andover, Conn.--.

Signed and Sealed this

Eighth Day of April, 1997

Attest:

BRUCE LEHMAN

Attesting Officer

Commissioner of Patents and Trademarks